United States Patent Office 2,933,470
Patented Apr. 19, 1960

2,933,470

COATING COMPOSITION OF A POLYSULFIDE POLYMER, MALEIC ANHYDRIDE AND SILICA AND METHOD OF MAKING AND USING SAME

Earl Harry Sorg and Edward Francis Kutch, Trenton, N.J., assignors to Thiokol Chemical Corporation, Trenton, N.J., a corporation of Delaware No Drawing. Application September 6, 1957
Serial No. 682,311

13 Claims. (Cl. 260—37)

This invention relates to the application of rubber-like coatings to various surfaces and more particularly to a composition adapted to be applied to metal and other surfaces and cured in situ thereon to form a rubbery coating having good adhesion, as well as good heat aging resistance and homogeneity.

It has been known for some years that rubbery coatings on metal surfaces can be obtained by applying to the metal surface a liquid polymer which is essentially composed of oxahydrocarbon groups linked by polysulfide groups and having free mercapto radicals, and a curing agent such as lead peroxide capable of reacting with the mercapto radical in situ on the metal surface and convert it to a rubber-like coating. Compositions of this type can be made which have good adhesion to metal surfaces and such compositions have been extensively used as lining materials for integral fuel tanks of aircraft because of their excellent resistance to petroleum hydrocarbons. Liquid polymers of the type referred to and methods of making such polymers are described in U.S. Patent 2,466,963 and in articles by Fettes and Jorczak published in Industrial and Engineering Chemistry, vol. 42, page 2217 (1950) and vol. 43, page 324 (1951). As pointed out in these published articles, the commercially available liquid polymers are generally prepared from dichloroethylformal and are essentially composed of recurring ($S.CH_2.CH_2.O.CH_2.O.CH_2CH_2.S$) groups, although a wide variety of such polymers may be made and many different types have been prepared in small quantities.

It is further known that better mixing of the ingredients of the polysulfide composition and superior homogeneity and heat aging resistance of the cured polymer can be obtained if curing is effected by means of properly compounded organic oxidizing agents. However, it has not heretofore been possible to secure satisfactory adherence to metal surfaces with polysulfide polymers cured with organic curing agents. Thus it has not been previously possible to obtain the desired combination of superior heat resisting properties, homogeneity and good adherence to metals.

It is accordingly an object of the present invention to provide a polysulfide polymer composition capable of being cured with organic curing agents to produce a rubbery coating that is strongly adherent to metal surfaces, as well as to the surfaces of such materials as wood, plastics, glass, concrete etc. It is another object of the invention to provide a material capable of forming a rubber-like coating that has both good adhesion to the surface to which it is applied and superior heat resisting properties. It is still another object of the invention to provide a rubbery-metal-coating material that is light-transmitting so that the underlying surface of the metal can be inspected after the coating has been applied. It is a still further object of the invention to provide a rubbery coating material that has improved resistance to aviation fuels. Other objects of the invention will be in part obvious and in part pointed out hereafter.

While the composition of the present invention can be applied to various non-metallic surfaces as indicated above, its chief utility at present appears to be as a metal-coating composition and accordingly it will be described herein for that application.

In one of its broader aspects the present invention comprises a composition which is predominantly a polysulfide polymer but has incorporated therein a finely divided silica and a quantity of maelic anhydride. It has been found that by mixing the proper quantities of silica and maleic anhydride with the polysulfide polymer as described below, a composition is obtained which can be cured with an organic curing agent to give a coating which is strongly adherent to metal surfaces. Moreover by selecting a silica having a refractive index the same as that of the polysulfide composition, i.e. about 1.55, it is possible to produce a light-transmitting coating so that the surface of the underlying metal can be inspected after application of the rubbery coating thereto. Such light-transmitting coatings could not previously be obtained because in prior compositions inorganic curing agents were used to achieve adhesion to the metal and such inorganic agents are insoluble in the polysulfide mixture and do not have refractive indices comparable with the mixture.

It has been found that from the point of view of achieving adhesion to metal surfaces, any of the commercially available finely divided silicas can be used. However, the refractive indices of the different commercial silicas vary substantially and hence when a light-transmitting product is desired, the choice of operative silicas is more restricted. Satisfactory transmission of light has been obtained using the silica sold under the trade name "Cab-O-Sil" which has a refractive index of about 1.55. The silica is preferably used in an amount of from 10 to 35 parts by weight per 100 parts of polysulfide polymers. The maleic anhydride is preferably added to the mixture in the form of a solvent solution in a suitable solvent, e.g. a 25% by weight solution in acetone, toluene, ethyl acetate or cyclohexanone. A quantity of solution is used such that about 0.1 to 2.0 parts by weight of maleic anhydride is added per 100 parts of polysulfide polymer.

In addition to the polysulfide polymer, silica and maleic anhydride, the present composition, when in condition for application to the metal surface to be coated, also contains a curing agent and a cure-promoting agent. The curing reaction proceeds at temperatures as low as atmospheric temperatures, and hence the curing agent should not be added until immediately before the composition is to be applied to the surface to be coated. However, the other ingredients, including the cure-promoting agent, can be conveniently premixed to form a chemically stable mixture that can be stored for considerable periods. As cure-promoting agents strongly basic organic amines such as ethylene diamine, diethylene triamine, triethylene tetramine and the like are desirably used in an amount of 0.5 to 5.0 parts by weight per 100 parts by weight of polymer. The preferred cure-promoting agent is 2,4,6 tri(dimethyaminomethyl) phenol which is preferably used in an amount of 0.7 to 2.0 parts by weight per 100 parts by weight of polymer. It may be noted that the use of large amounts of the amine should be avoided since the presence of a large amount of the amine tends to cause loss of adhesion when the coating is exposed to water.

Curing of the present composition may be effected with any of the soluble organic curing agents known to be effective for the curing of polythiopolymercaptans, e.g. tertiary butyl hydroperoxide. The preferred curing agent is 70% cumene hydroperoxide and it is desirably used in an amount of 2 to 10 parts by weight per 100 parts by weight of polymer. The cumene hydroperoxide used may be the standard commercial product which comprises about 70% by weight cumene hydroperoxide with the remainder being other organic liquids such as alcohols and ketones.

In order to point out more fully the nature of the present invention the following specific examples are given of illustrative methods of making and curing the present compositions:

*Example 1*

The polysulfide polymer used in this example is a liquid polymer having a molecular weight of about 4000. It may be prepared by the procedure of Example XII of Patent 2,466,963 mentioned above except that four times the quantity of trichloropropane called for in Example XII is used to provide about 2% of cross-linking. This polymer is a commercial polymer designated LP-2 in the Fettes and Jorczak articles referred to above.

A masterbatch was made by dispersing and mixing on a paint mill 350 grams of this LP-2 polymer, 5.25 grams of 2,4,6-tri(dimethylaminomethyl) phenol and 52.5 grams of very fine particle size silicon dioxide filler with a refractive index of 1.55. A portion of this masterbatch comprising 58.25 grams was segregated and 1.5 grams of a 25% solution of maleic anhydride in cyclohexanone thoroughly dispersed therein. Thereafter 3.5 grams of 70% cumene hydroperoxide was thoroughly mixed with the composition, and the composition was applied as a coating to a number of aluminum test panels for curing and testing. The formula of this composition is as follows:

| Ingredient: | Parts by weight |
|---|---|
| Liquid polymer (LP-2) | 100 |
| Aminoalkylphenol | 1.5 |
| Silica | 15 |
| 25% solution of maleic anhydride in cyclohexanone | 3 |
| 70% cumene hydroperoxide | 7 |

Some of the test coatings were allowed to cure at room temperature for 120 hours and others were cured for 24 hours at room temperature followed by a 5 hour cure at 158° F. The hardness of the coatings as measured with a Shore A Durometer was as follows:

| | |
|---|---|
| 24 hrs. at room temp. | 30 |
| 120 hrs. at room temp. | 33 |
| 24 hrs. at room temp. + 5 hrs. at 158° F. | 38 |

In all cases the coatings were translucent. In the case of the test panels cured at room temperature for 120 hrs. and those cured for 24 hrs. at room temperature with a subsequent 5 hr. cure at 158° F. the adhesion of the coating to the metal was excellent.

*Example 2*

The polysulfide polymer used in this example is similar to that used in Example 1 except that it has only about one-fourth as many cross-links. It may be prepared by the procedure of Example XII of Patent 2,466,963.

A coating composition having the following formula was prepared as described below:

| Ingredient: | Parts by weight |
|---|---|
| Liquid polysulfide polymer | 100 |
| Aminoalkylphenol | 1.2 |
| Silica | 20 |
| 25% solution of maleic anhydride in cyclohexanone | 2 |
| 70% cumene hydroperoxide | 6 |

The polymer, aminophenol and silica were mixed and milled on a paint mill to secure thorough mixing. The maleic anhydride solution was added in small portions during the milling. Thereafter the cumene hydroperoxide was thoroughly mixed into the composition.

The resulting composition was applied as a coating to test panels and cured as in Example 1. The hardness and adhesion of the test coatings were substantially the same as described in Example 1.

It is of course to be understood that the foregoing example is illustrative only and that numerous changes can be made in the ingredients and proportions set forth without departing from the spirit of the invention as set forth in the appended claims.

We claim:

1. A composition adapted to be mixed with a curing agent, applied to a surface and cured in situ thereon to form a rubbery coating having improved adhesion to the surface, said composition comprising 100 parts by weight of viscous liquid polymer essentially composed of aliphatic saturated oxahydrocarbon radicals interconnected by polysulfide groups and having free mercapto radicals, 10 to 40 parts by weight of finely divided silica and 0.1 to 2.0 parts by weight of maleic anhydride.

2. A composition adapted to be mixed with a curing agent, applied to a surface and cured in situ thereon to form a light-transmitting rubbery coating having improved adhesion to the surface, said composition comprising 100 parts by weight of a viscous liquid polymer essentially composed of aliphatic saturated oxahydrocarbon radicals interconnected by polysulfide groups and having free mercapto radicals, 10-40 parts by weight of finely divided silica having a refractive index of about 1.55, and 0.1 to 2.0 parts by weight of maleic anhydride.

3. A composition adapted to be mixed with a curing agent, applied to a metal surface and cured in situ thereon to form a rubbery coating having improved adhesion to the surface, said composition comprising 100 parts by weight of a viscous liquid polymer essentially composed of aliphatic saturated oxahydrocarbon radicals interconnected by polysulfide groups and having free mercapto radicals, 10–40 parts by weight of finely divided silica, 0.5 to 5.0 parts by weight of a strongly basic amine and 0.1 to 2.0 parts by weight of maleic anhydride.

4. A composition adapted to be mixed with a curing agent, applied to a metal surface and cured in situ thereon to form a coating having improved adhesion to the surface, said composition comprising 100 parts by weight of a viscous polymer essentially composed of aliphatic saturated oxahydrocarbon radicals interconnected by polysulfide groups and having free mercapto radicals, 10–40 parts by weight of finely divided silica, 0.7 to 2.0 parts by weight of 2,4,6-tri(dimethylaminomethyl) phenol and 0.1 to 2.0 parts by weight of maleic anhydride.

5. A composition adapted to be mixed with a curing agent, applied to a metal surface, and cured in situ thereon to form a coating with improved adhesion to the surface, said composition comprising the following ingredients in substantially the amounts stated in parts by weight:

| | Parts |
|---|---|
| Liquid polymer essentially composed of aliphatic saturated oxahydrocarbon radicals interconnected by polysulfide groups and having free mercapto radicals | 100 |
| 2,4,6-tri(dimethylaminomethyl) phenol | 1.2 |
| Finely divided silica with refractive index of 1.55 | 20 |
| 25% solution of maleic anhydride in cyclohexanone | 2 |

6. The method of making a rubbery coating composition having improved adherence to metal surfaces which comprises incorporating in 100 parts by weight of a viscous liquid polymer essentially composed of aliphatic saturated oxahydrocarbon radicals interconnected by polysulfide groups and having free mercapto groups, 10–40 parts by weight of finely divided silica and 0.1 to 2.0 parts by weight of maleic anhydride, and adding to the resulting mixture 2–10 parts by weight of a curing agent which is an organic oxidizing agent reactive with said mercapto groups to convert said polymer into a solid rubbery mass.

7. A method according to claim 6 and wherein said curing agent is cumene hydroperoxide.

8. The method of producing a rubber-like coating on a metal surface which comprises preparing an intimate mixture of 100 parts by weight of a viscous liquid polymer essentially composed of aliphatic saturated oxahydrocarbon radicals interconnected by polysulfide groups and having free mercapto radicals, 10–40 parts by weight of finely divided silica, 0.1 to 2.0 parts by weight of maleic anhydride and 2–10 parts by weight of a curing agent which is an organic oxidizing agent reactive with said mercapto groups to convert said polymer into a solid rubbery mass, applying the resulting composition to the metal surface to be coated, and curing the composition in situ to convert it into a tough, strongly adherent rubber-like coating.

9. A method according to claim 8 and wherein said silica has a refractive index of about 1.55 to render the cured coating light-transmitting.

10. A method according to claim 8 and wherein said curing agent is tertiary butyl hydroperoxide.

11. A method according to claim 8 and wherein said curing agent is cumene hydroperoxide.

12. A light-transmitting rubbery composition produced by curing the composition of claim 2.

13. A light-transmitting rubbery composition produced by curing the composition of claim 5.

References Cited in the file of this patent

UNITED STATES PATENTS

| | | |
|---|---|---|
| 2,311,613 | Slayter | Feb. 16, 1943 |
| 2,787,608 | Gregory et al. | Apr. 2, 1957 |